United States Patent [19]
Robinson

[11] 4,385,642
[45] May 31, 1983

[54] BI-STABLE ELECTRICALLY OPERATED VALVE
[75] Inventor: William P. Robinson, Lockport, N.Y.
[73] Assignee: Hydraulic Servocontrols Corporation, Buffalo, N.Y.
[21] Appl. No.: 226,078
[22] Filed: Jan. 19, 1981
[51] Int. Cl.³ .................. F16K 31/12; F16K 31/02
[52] U.S. Cl. .................. 137/885; 137/875; 251/130; 251/281
[58] Field of Search .................. 137/625.65, 625.44, 137/875, 885, 613; 251/282, 138, 130, 129, 65, 281

[56] References Cited
U.S. PATENT DOCUMENTS

| | | | |
|---|---|---|---|
| 2,667,897 | 2/1954 | Huntington | 251/130 |
| 2,752,947 | 7/1956 | Hruska | 251/282 |
| 2,874,929 | 2/1959 | Klingler | 251/129 |
| 3,396,751 | 8/1960 | Bender | 251/282 |
| 3,420,494 | 1/1969 | Egner | 251/130 |
| 3,457,955 | 7/1969 | Kleiner et al. | 137/625.44 |
| 3,471,119 | 10/1969 | Risk | 251/84 |
| 3,532,121 | 10/1970 | Sturmon et al. | 251/129 |
| 3,643,699 | 2/1972 | Mason | 137/625.64 |
| 3,661,183 | 5/1972 | Komaroff et al. | 137/625.65 |
| 3,790,127 | 2/1974 | Reip | 251/281 |
| 3,865,140 | 2/1975 | Greenwood | 137/625.64 |
| 3,938,778 | 2/1976 | Hansen | 251/129 |
| 4,165,762 | 8/1979 | Acar | 137/625.65 |

Primary Examiner—A. Michael Chambers
Attorney, Agent, or Firm—Joseph P. Gastel

[57] ABSTRACT

A bi-stable electrically operated valve including a housing having inlet, outlet and return conduits, an intermediate conduit between the inlet and return conduits, a bi-stable electro-mechanical transducer having a flapper slidably mounting a first ball valve, first and second seats on the intermediate conduit, a third seat on the outlet conduit, the first and third seats being alternately engageable by the first ball valve to permit communication between the inlet and outlet conduits when the valve is open or between the inlet and return conduits when the valve is closed, a second ball valve, a piston for moving the second ball valve onto the second seat on the intermediate conduit, a conduit for effecting communication between the outlet conduit and the piston so as to cause the piston to drive the second ball valve onto the second seat when the inlet and outlet conduits are in communication, to thereby close off the inlet conduit from the return conduit, and a bleed opening between the inlet conduit and the intermediate conduit so as to provide equal pressure on opposite sides of the first ball valve when the valve is open and the first ball valve is on the first seat on the intermediate conduit.

21 Claims, 8 Drawing Figures

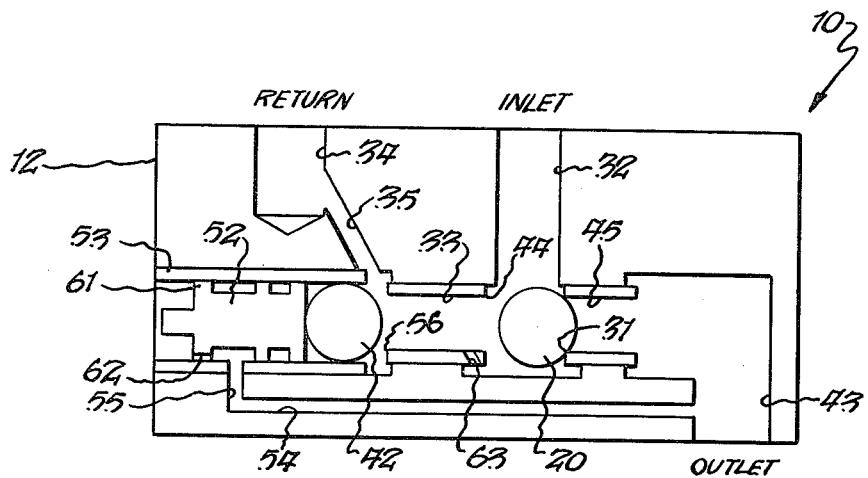
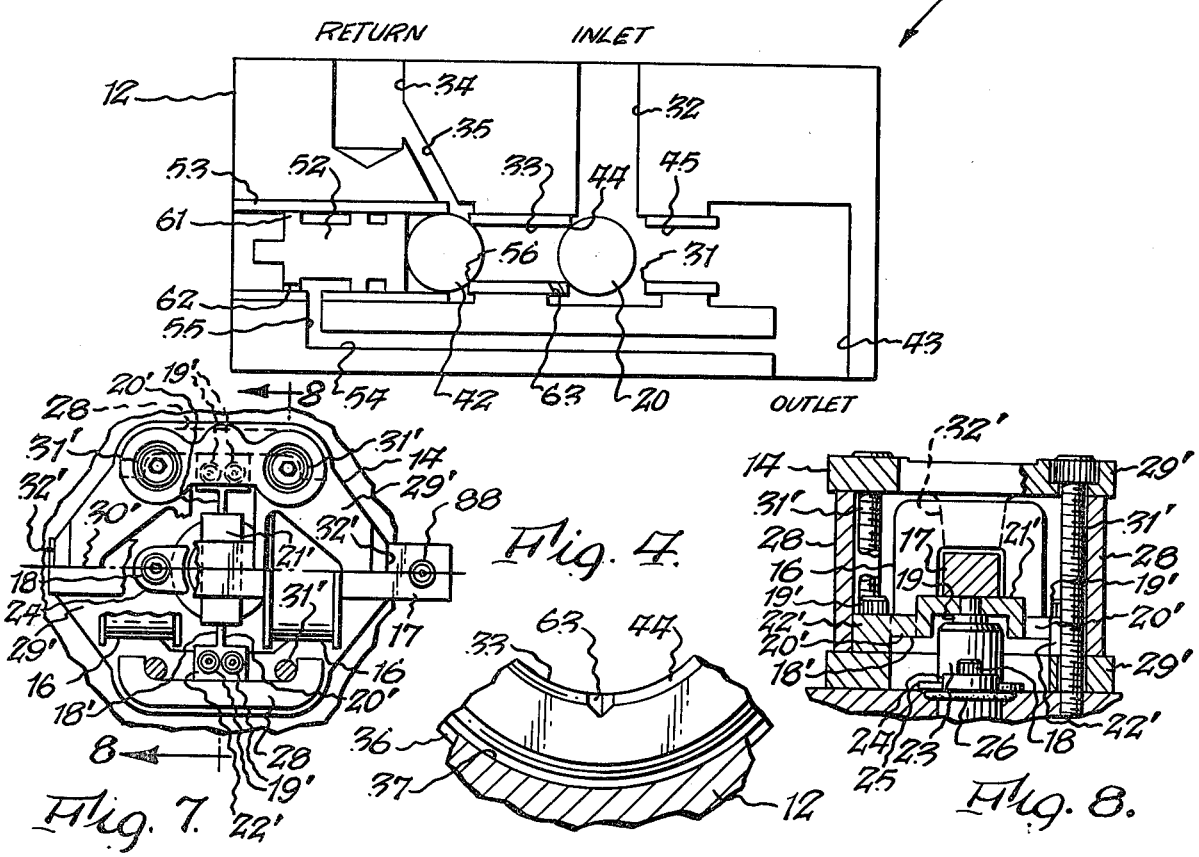

4,385,642

BI-STABLE ELECTRICALLY OPERATED VALVE

BACKGROUND OF THE INVENTION

The present invention relates to a electrically operated valve of the type utilized to control fluid flow.

By way of background, in jet engine applications, and in other applications, electrically operated valves were used for routing pressurized fluid from a fluid source to an outlet or for conducting the pressurized fluid back to another area via a return conduit. These valves were generally of the bi-stable type, which will remain in the position in which they were last placed, that is, in an open or closed position. In the past, when moving from an open to a closed position, the valves had to overcome the fluid pressure in order to close. In addition, the arrangement for terminating pressurized fluid flow to the return conduit when the valve was opened was rather complex.

SUMMARY OF THE INVENTION

It is accordingly one object of the present invention to provide an improved electrically operated valve in which the movement of the valve from an open to a closed position is not opposed appreciably by pressurized fluid, and thus the movement of the valve can be effected with very small force.

Another object of the present invention is to provide an improved electrically operated valve in which the fluid pressure of the source which is caused to communicate with the outlet conduit when the valve is in an open position, is also utilized to terminate communication between the inlet and return conduits.

A further object of the present invention is to provide an improved electrically operated valve in which fluid pressure from the source is utilized to reestablish communication between the inlet and the return conduits when the valve is shifted to a closed position.

Yet another object of the present invention is to provide an improved bi-stable electrically operated valve which includes a mechanical arrangement to close the valve in the event of the failure of electrical power. Other objects and attendant advantages of the present invention will readily be perceived hereafter.

The present invention relates to an electrically operated valve comprising a housing; a bi-stable electromechanical transducer in said housing, an inlet conduit in said housing; a return conduit in said housing; an outlet conduit in said housing; an intermediate conduit for effecting communication between said inlet conduit and said return conduit; first, second and third valve seats in said housing; first valve means operatively coupled to said electromechanical transducer for selective movement to an open position by moving away from said first valve seat for effecting communication between said inlet conduit and said outlet conduit and for movement to a closed position by moving away from said second valve seat for effecting communication between said inlet conduit and return conduit through said intermediate conduit; and second valve means responsive to said first valve means being in said open position away from said first valve seat for moving onto said third valve seat for terminating communication between said intermediate conduit and said return conduit. The various aspects of the present invention will be more fully understood when the following portions of the specification are read in conjunction with the accompanying drawings wherein:

BRIEF DESCRIPTION OF THE DRAWINGS

FIG. 4 is a fragmentary enlarged cross sectional view taken substantially along line 4—4 of FIG. 3;

FIG. 5 is a schematic view of the valve in a closed position;

FIG. 6 is a schematic view of the valve in an open position;

FIG. 7 is a fragmentary view taken substantially in the direction of arrows 7—7 of FIG. 1; and FIG. 8 is a fragmentary cross sectional view taken substantially along line 8—8 of FIG. 7.

DESCRIPTION OF THE PREFERRED EMBODIMENTS

Figure 1:
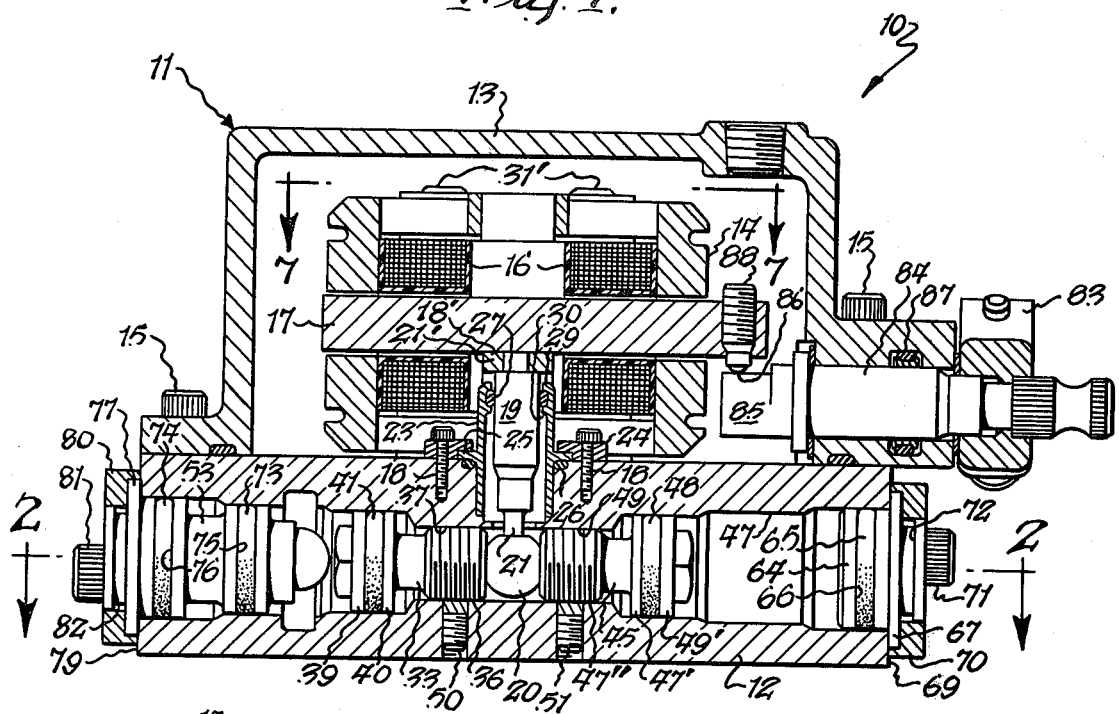
FIG. 1 is a cross sectional view of the improved valve of the present invention taken substantially along line 3—3 of FIG. 2.

The improved electrically operated shut-off valve 10 of the present invention includes a housing 11 including a block 12 in which the various valves and associated conduits are located and an upper shell portion 13, which encloses an electromechanical transducer in the nature of a torque motor 14, is secured to block 12 by means of a plurality of screws 15. While the following portions of the specification will be directed to a torque motor, it will be appreciated that any suitable type of electro-mechanical transducer may be employed in the electrically-operated valve. The torque motor 14 includes coils 16 surrounding armature 17 which carries flapper 19 on which slotted ball valve 20 is mounted. The lower portion 21 of the flapper is rectangular and is slidably received in a mating rectangular opening 22 in ball valve 20. The slidable connection permits the ball valve to seat properly. Flapper 19 is housed within tube 23 which is held in position by a pair of step clamp members 24 which bear on annular flange 25 and are held in position by screws 18 (FIGS. 1, 7 and 8). Armature 17, flapper 19, and spring member 18' comprise a three-piece brazed assembly, which is conventional. Spring member 18' includes blocks 21' and 22' and resilient webs 20'. Screws 19' secure blocks 22' at the outer ends of spring member 18' to lower frame member 29' and block 12. Block 21' is secured between armature 17 and flapper 19. Spring member 18' provides the pivotal mounting of armature 19 and flapper 17 on block 12. In this respect, resilient webs 20' between blocks 21' and 22' provide the spring action, as is conventional. An O-ring 26 provides a seal between block 12 and tube 23. A second O-ring 27 surrounds flapper 19 and is held in position by annular rims 29 and 30 on tube 23 to prevent fluid within tube 23 passing into the shell 13 where the torque motor is located.

Permanent magnets 28 are located on opposite sides of armature 17 to hold the latter in the position in which it was last placed to thereby produce the desired bi-stable characteristic. The holding force may also be provided by coil flux or by mechanical structure, as is well known in the art. In the preferred embodiment shown, electrical power is required only for switching the valve between open and closed positions. However, if desired, the proper coil or coils may remain energized in the open or closed positions during operation. The advantage of requiring electric power only for switching is that there is a conservation of electric power, the obviating of heating problems, and increased reliability. Permanent magnets 28 are positioned in mirror image relationship between upper and lower frame members 29'. The entire torque motor, including frame members 29', is substantially symmetrical about centerline 30'. Each frame member 29' carries a pair of poles 32' on opposite sides thereof. The poles 32' direct the magnetic flux to the armature 17. Screws 31' secure the torque motor 14 to block 12, at tapped holes (not shown). The bi-stable characteristic is preferred in the present application of governing fuel flow to a jet engine where the valve is either open or closed. However, it will be appreciated that the valve structure to be described hereafter can be actuated by any type of electro-mechanical transducer.

While the valve 10 is primarily intended for use as a fuel shut-off valve for a jet engine, it will be appreciated that it can be used in any environment wherein a fluid is to be supplied to an outlet and when communication with the outlet is terminated, the fluid is to be directed to another area, such as a return conduit. The valve is shown in a closed position in FIG. 5 wherein ball valve 20 is seated on seat 31. Under these circumstances fluid will pass into inlet conduit 32 and then through intermediate conduit 33 and then into return conduit 34 through bore 35, which is a portion of the return conduit. The intermediate conduit 33 is essentially a tube having a threaded portion 36 which is received in a mating tapped portion 37 in block 12. A pair of annular flanges 39 and 40 on tube 33 contain an O-ring 41 which provides a fluid-tight seal between tube 33 and block 12. When there is flow from the inlet conduit 32 to the return conduit 34, as described above, ball valve 42 is in the position shown in FIG. 3.

Figure 2:
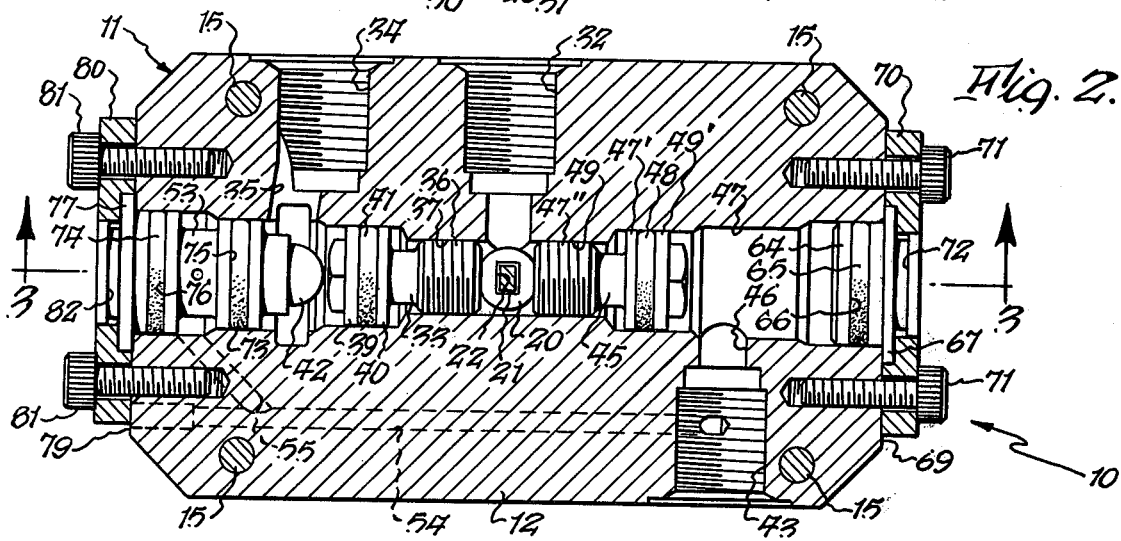
FIG. 2 is a cross sectional view taken substantially along line 2—2 of FIG. 1.

When it is desired to open the valve to place the inlet conduit 32 in communication with the outlet conduit 43, the ball valve 20 is shifted from the position of FIG. 5 to the position of FIG. 6 by energizing the torque motor 14 with the appropriate polarity signal. This will cause ball valve 20 to move away from seat 31 and onto seat 44, and at this time fluid will flow from inlet conduit 32 through tube 45 and into outlet conduit 43 through bore 46 (FIG. 2) which effects communication between bore 47 and outlet conduit 43. At this point it is to be noted that tube 45 has a threaded outer surface 47" which is received in tapped bore 49, and that an O-ring 48 is located between annular flanges 47' and 49' to effect sealing with block 12. During fabrication, after tubes 33 and 45 are adjusted to their proper position, they are locked by the use of set screws 50 and 51, respectively.

When there is pressurized fluid in outlet 43, this is communicated to pilot piston 52 which is mounted for reciprocation in pilot piston housing 53. This communication is effected through bores 54 and 55 in block 12, annular chamber 68, and bore 58 in housing 53. The pressure on pilot piston 52 can build up because of the fact that ball valve 20 seats on seat 44. The existence of high pressure on the left of pilot piston 52 will cause it to move to the right from the position of FIG. 5 to the position of FIG. 6 and thus move ball valve 42 onto seat 56 located at the end of tube 33, thereby terminating communication between conduit 33 and bore 35. At this point it is to be noted that pilot piston 52 has a pair of annular flanges 57 and 59 which contain O-ring 60 so that there is no leakage between this portion of pilot piston 52 and its housing 53. It is to be further noted that the annular flange 61 is cut away at 62 to permit the high pressure fluid to act on the pilot piston in such a manner as to move it to the right, as noted above.

Figure 3:
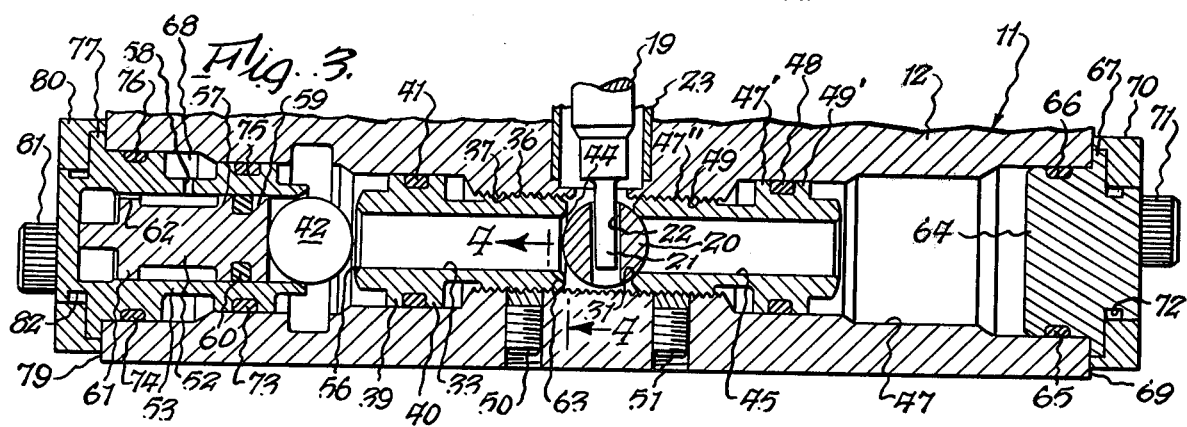
FIG. 3 is a cross sectional view taken substantially along line 3—3 of FIG. 2 and showing the valve structure in enlarged detail.

It is to be noted that immediately after ball 20 seats on seat 44, intermediate conduit 33 will be at the low pressure of the return conduit 34 while pressure builds up in outlet conduit 43. However, there will be a bleeding of fluid at inlet pressure into conduit 33 through bleed opening 63 on valve seat 44 (FIGS. 3 and 4). This permits the high pressure fluid, which is now passing to outlet conduit 43, to communicate with the inside of tube 33. However, pilot piston 52 will have seated valve 42 onto seat 56 before pressure on conduit 33 builds up to inlet pressure through bleed 63. After this pressure builds up, the same high pressure fluid will be exerted on the portion of ball valve 42 which is exposed to the inside of conduit 33 and to pilot piston 52. However, since the effective surface area of pilot piston 52 is approximately twice the area of the portion of ball valve 42 which closes off tube 33, ball valve 42 will be held in its closed position whenever ball valve 20 occupies the open position shown in FIG. 6.

Whenever it is desired to return ball valve 20 to the closed position shown in FIG. 5, the torque motor 14 is energized with the appropriate polarity signal to cause the flapper 19 to move ball valve 20 toward seat 31. However, since the pressure within conduit 33 and 45 are equal, ball valve 20 does not have to overcome the fluid pressure which would otherwise resist closing of this valve. As the ball valve 20 approaches seat 31, the outlet pressure in conduit 43 will decrease and the pressure in inlet conduit 32 will rise because ball valve 20 is restricting the flow. The reduced pressure in outlet 43 and in conduit 54 which biases pilot piston 52 to the right will therefore also decrease and the pressure within conduit 33 will increase. A state will be reached where there is a greater force tending to move ball valve 42 to the left in FIG. 6 than the force tending to move it to the right and subsequently ball valve 42 and piston 52 will move to the position shown in FIG. 5 wherein the inlet conduit 32 will be in communication with return conduit 34 through conduit 33 and bore 35.

The bore 47 is sealed at its end by a plug 64 which has an O-ring 65 which is located in groove 66. An annular flange 67 on plug 64 bears against end wall 69 of block 12 and a plate 70 is held in position against flange 67 by screws 71. A groove 82 is provided in plug 64 to receive a gripping tool which is used to pull plug 64 from the block 12. The pilot housing 53 mounts two O-rings 73 and 74 in grooves 75 and 76, respectively, to thus provide sealing with block 12. An annular flange 77 on housing 53 bears against end wall 79 of block 12 and a plate 80 bears against flange 77, and plate 80 is held in position by screws 81 which thread into block 12. A groove 82 is provided in housing 53 to receive a gripping tool which is used to pull housing 53 from block 12. Housing 53, in addition to serving the function of being a housing for pilot piston 52, also serves as an end plug for the bore in which conduit 33 is located.

It is to be again noted that the energization of the torque motor for opening the valve is of opposite polarity from that required for closing the valve. This change in polarity can be accomplished by reversal of the direction of current flow or by the selective energization of one coil 16 for opening the valve and the other coil 16 for closing the valve.

In the event of electrical failure which renders torque motor 14 inoperative, ball valve 20 can be moved manually onto the seat 31 to thereby close the valve. This is effected by the use of lever 83 which is keyed to shaft 84 which mounts a cam 85 which engages cam follower 86 mounted on adjusting screw 88 on armature 17. An O-ring 87 seals shaft 84 against leakage. By manipulating lever 83, cam 85 will pivot armature 17 to cause flapper 19 to move ball valve 20 into the closed position on seat 31. It will be appreciated that since the torque motor is bi-stable, it will remain in the position in which it was last placed, and thus the use of the manual override to close the valve is especially beneficial in the event of electrical failure.

While a preferred embodiment of the present invention has been disclosed, it will be appreciated that the present invention is not limited thereto but may be otherwise embodied within the scope of the following claims.

What is claimed is:

1. An electrically operated valve comprising a housing; an electro-mechanical transducer in said housing, an inlet conduit in said housing; a return conduit in said housing; an outlet conduit in said housing; an intermediate conduit for effecting communication between said inlet conduit and said return conduit; first, second and third valve seats in said housing; first valve means operatively coupled to said electromechanical transducer for selective movement to an open position by moving away from said first valve seat and onto said second valve seat for effecting communication between said inlet conduit and said outlet conduit and for movement to a closed position by moving away from said second valve seat and onto said first valve seat; and second valve means responsive to said first valve means being in said open position and on said second valve seat for moving onto said third valve seat for terminating communication between said intermediate conduit and said return conduit and responsive to said first valve means being in said closed position and away from said second valve seat for effecting communication between said inlet conduit and return conduit through said intermediate conduit.

2. An electrically operated valve as set forth in claim 1 wherein said second valve seat is on said intermediate conduit, and bleed means for effecting communication between said inlet conduit and said intermediate conduit when said first valve means is on said second valve seat.

3. An electrically operated valve as set forth in claim 1 wherein said second valve means includes piston means for moving said second valve means to said position on said third valve seat for terminating communication between said intermediate conduit and said return conduit, and conduit means for effecting communication between said outlet conduit and said piston means to cause said piston means to move said second valve means onto said third valve seat when said inlet conduit is in communication with said outlet conduit.

4. An electrically operated valve as set forth in claim 3 wherein said second valve seat is on said intermediate conduit, and bleed means for effecting communication between said inlet conduit and said intermediate conduit when said first valve means is on said second valve seat.

5. An electrically operated valve as set forth in claim 4 wherein said first valve means comprises a first ball valve, and wherein said second valve means comprises a second ball valve, and wherein the effective surface area of said second ball valve exposed to fluid pressure in said intermediate conduit which is in communication with said outlet conduit through said bleed means is less than the effective surface area of said piston means exposed to fluid pressure in said outlet conduit.

6. An electrically operated valve as set forth in claim 5 wherein said first and second ball valves are aligned and wherein said intermediate conduit includes said second valve seat at one end thereof and said third valve seat at the other end thereof.

7. An electrically operated valve as set forth in claim 6 wherein said piston means is in alignment with said first and second ball valves and said intermediate conduit.

8. An electrically operated valve as set forth in claim 7 including a second housing for containing said piston means, and means for mounting said second housing within said housing.

9. An electrically operated valve as set forth in claim 6 wherein said intermediate conduit comprises a tube, and securing means for securing said tube in said housing.

10. An electrically operated valve as set forth in claim 9 wherein said securing means comprises a threaded connection between said tube and said housing.

11. An electrically operated valve as set forth in claim 9 including a second tube in alignment with said tube, said first valve seat being on said second tube for receiving said first ball, and second securing means for securing said second tube within said housing.

12. An electrically operated valve as set forth in claim 11 wherein said securing means and said second securing means comprise threaded connections between said tubes and said housing.

13. An electrically operated valve as set forth in claim 1 including mechanical override means for selectively moving said first valve means away from said second valve seat and onto said first valve seat and for terminating communication between said inlet and outlet conduits.

14. An electrically operated valve as set forth in claim 13 wherein said electro-mechanical transducer includes an armature coupled to said first valve means, and wherein said mechanical override means comprise mechanical linkage means having a first portion for receiving an external force, and a second portion for engaging said armature.

15. An electrically operated valve as set forth in claim 14 wherein said mechanical linkage means comprise a shaft, and wherein said second portion comprises a cam on said shaft for moving said armature upon rotation of said shaft.

16. An electrically operated valve comprising a housing; an electro-mechanical transducer in said housing, an inlet conduit in said housing; a return conduit in said housing; an outlet conduit in said housing; an intermediate conduit for effecting communication between said inlet conduit and said return conduit; first, second and third valve seats in said housing, first valve means operatively coupled to said transducer for selective movement to an open position by moving away from said first valve seat for effecting communication between said inlet conduit and said outlet conduit and for movement to a closed position onto said first valve seat and for moving away from said second valve seat; and second valve means responsive to said first valve means being in said open position away from said first valve seat for moving onto said third valve seat for terminating communication between said intermediate conduit and said return conduit and responsive to said first valve means being in said closed position and away from said second valve seat for effecting communication between said inlet conduit and return conduit through said intermediate conduit.

17. An electrically operated valve comprising a housing; an electro-mechanical transducer in said housing, an inlet conduit in said housing; a return conduit in said housing; an outlet conduit in said housing; an intermediate conduit for effecting communication between said inlet conduit and said return conduit; first, second and third valve seats in said housing; first valve means operatively coupled to said transducer for selective movement to an open position by moving away from said first valve seat for effecting communication between said inlet conduit and said outlet conduit and for movement to a closed position by moving away from said second valve seat; second valve means responsive to said first valve means being in said open position away from said first valve seat for moving onto said third valve seat for terminating communication between said intermediate conduit and said return conduit and responsive to said first valve means being in said closed position and away from said second valve seat for effecting communication between said inlet conduit and return conduit through said intermediate conduit, said second valve seat being on said intermediate conduit, and said first valve means being on said second valve seat when said first valve means is in an open position, and bleed means for effecting communication between said inlet conduit and said intermediate conduit when said first valve means is on said second valve seat.

18. An electrically operated valve comprising a housing; an electro-mechanical transducer in said housing, an inlet conduit in said housing; a return conduit in said housing; an outlet conduit in said housing; an intermediate conduit for effecting communication between said inlet conduit and said return conduit; first, second and third valve seats in said housing; first valve means operatively coupled to said transducer for selective movement to an open position by moving away from said first valve seat for effecting communication between said inlet conduit and said outlet conduit and for movement to a closed position by moving away from said second valve seat; second valve means responsive to said first valve means being in said open position away from said first valve seat for moving onto said third valve seat for terminating communication between said intermediate conduit and said return conduit and responsive to said first valve means being in said closed position and away from said second valve seat for effecting communication between said inlet conduit and return conduit through said intermediate conduit, and mechanical override means for selectively moving said first valve means away from said second valve seat and onto said first valve seat for effecting communication between said inlet conduit and said return conduit through said intermediate conduit and for terminating communication between said inlet and outlet conduits.

19. An electrically operated valve as set forth in claim 18 wherein said electro-mechanical transducer includes an armature coupled to said first valve means, and wherein said mechanical override means comprise mechanical linkage means having a first portion for receiving an external force, and a second portion for engaging said armature.

20. An electrically operated valve as set forth in claim 19 wherein said mechanical linkage means comprise a shaft, and wherein said second portion comprises a cam on said shaft for moving said armature upon rotation of said shaft.

21. An electrically operated valve comprising a housing; an electro-mechanical transducer in said housing, an inlet conduit in said housing; a return conduit in said housing; an outlet conduit in said housing; an intermediate conduit for effecting communication between said inlet conduit and said return conduit; first and second valve seats in said housing; first valve means operatively coupled to said transducer for selective movement to an open position by moving away from said first valve seat for effecting communication between said inlet conduit and said outlet conduit and for movement to a closed position by moving onto said first valve seat; and second valve means and conduit means responsive to said first valve means being in said open position away from said first valve seat for moving onto said second valve seat for terminating communication between said intermediate conduit and said return conduit and responsive to said first valve means being in said closed position for effecting communication between said inlet conduit and return conduit through said intermediate conduit.

* * * * *